United States Patent
Junger

(10) Patent No.: US 9,202,229 B2
(45) Date of Patent: Dec. 1, 2015

(54) SYSTEMS AND/OR METHODS FOR MANAGING "SHOW-ROOMING" PRACTICES

(75) Inventor: Peter J. Junger, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 101 days.

(21) Appl. No.: 13/495,436

(22) Filed: Jun. 13, 2012

(65) Prior Publication Data

US 2013/0339113 A1     Dec. 19, 2013

(51) Int. Cl.
G06Q 30/00     (2012.01)
G06Q 30/02     (2012.01)

(52) U.S. Cl.
CPC ........ G06Q 30/0207 (2013.01); G06Q 30/0222 (2013.01); G06Q 30/0239 (2013.01)

(58) Field of Classification Search
USPC ...................................................... 705/14.13
See application file for complete search history.

(56) References Cited

U.S. PATENT DOCUMENTS

| | | | |
|---|---|---|---|
| 5,644,723 A * | 7/1997 | Deaton et al. | 705/14.41 |
| 5,978,774 A | 11/1999 | Rogers et al. | |
| 6,018,719 A | 1/2000 | Rogers et al. | |
| 6,076,070 A * | 6/2000 | Stack | 705/20 |
| 6,085,172 A | 7/2000 | Junger | |
| 6,466,202 B1 * | 10/2002 | Suso et al. | 345/169 |
| 6,622,015 B1 * | 9/2003 | Himmel et al. | 455/414.1 |
| 6,947,941 B1 | 9/2005 | Koon | |
| 7,433,832 B1 * | 10/2008 | Bezos et al. | 705/26.8 |
| 2011/0099060 A1 * | 4/2011 | Litzow et al. | 705/14.44 |
| 2011/0251911 A1 | 10/2011 | Junger et al. | |
| 2011/0295671 A1 * | 12/2011 | Thomas et al. | 705/14.25 |
| 2012/0078739 A1 | 3/2012 | Maraz | |

(Continued)

FOREIGN PATENT DOCUMENTS

| JP | 2009-252248 | 10/2009 |
|---|---|---|
| KR | 10-2005-0109214 | 11/2005 |

(Continued)

OTHER PUBLICATIONS

U.S. Appl. No. 61/522,966, filed Aug. 12, 2011; Junger et al.

(Continued)

*Primary Examiner* — John G Weiss
*Assistant Examiner* — Scott C Anderson
(74) *Attorney, Agent, or Firm* — Nixon & Vanderhye PC

(57) ABSTRACT

Certain exemplary embodiments relate to systems and/or methods for managing "show-rooming" practices of consumers, e.g., where consumers interact with a product at a sometimes convenient brick-and-mortar location, only to later purchase the product from a different (and typically online) provider. Distinct special offers (e.g., in the form of price adjustments) may be presented to potential show-rooming consumers, e.g., via a mobile device operated by those consumers. In certain exemplary embodiments, the distinct special offers may be generated based on, for example, pricing information gathered from competitors, rules specified by the brick-and-mortar location, characteristics or habits of a particular consumer using a particular device, recent trends, etc. The rate at which browsing consumers buy products for which they are presented with special offers, etc., may be monitored and fed back into the system, e.g., to help provide a more finely tuned special offer that helps preserve profit for the seller.

29 Claims, 9 Drawing Sheets

(56) References Cited

U.S. PATENT DOCUMENTS

2012/0085829 A1 4/2012 Ziegler
2012/0123845 A1 5/2012 Junger et al.

FOREIGN PATENT DOCUMENTS

KR 10-2007-0032510 3/2007
KR 10-0712016 4/2007

OTHER PUBLICATIONS

Jeff Greenhouse, "Adapting Retail for Mobi-Sapiens: 3 Examples of Innovation in Embracing the Mobile Shopper," Jeff Greenhouse, retrieved Jun. 11, 2012. http://www.jeffgreenhouse.com/2011/11/18/mobile-shopping-innovation/.
"QR Codes for Retail Stores," QRHERE, May 2, 2011. http://qrhere.wordpress.com/2011/05/02/qr-codes-for-retail-stores/.
Karen Talley, "As Many as 1 in 5 Consumers Shop at Store, but Buy Online," The Wall Street Journal, Mar. 5, 2012. http://blogs.wsj.com/economics/2012/03/05/as-many-as-1-in-5-consumers-shop-at-store-but-buy-online/?mod=wsj_share_twitter.
"'Showrooming' Is a Valid Concern for Retailers," EMARKETER, Mar. 19, 2012. http://www.emarketer.com/Article.aspx?R=1008910.
"More Evidence of 'Show-Rooming' Effect," retailingtoday.com, Feb. 16, 2012. http://retailingtoday.com/article/more-evidence-show-rooming-effect.
"Best Buy Launching Price-Matching for All Products," DEALERSCOPE, Mar. 1, 2012. http://www.dealerscope.com/article/best-buy-launching-price-matching/1?sponsor=newsletter/today&e=peter.junger%40siras.com#utm_source=today&utm_medium=enewsletter_continue_story2&utm_campaign=Mar. 2, 2012.
Ryan Kim, "Savvy Rebrands as Eyeona to Help Retailers Fight Amazon," GIGAOM, Feb. 23, 2012. http://gigaom.com/2012/02/23/savvy-rebrands-as-eyeona-to-help-retailers-fight-amazon/.
David Welch, "Wal-Mart Gears Up Online as Customers Defect to Amazon," Bloomberg Businessweek, Mar. 20, 2012. http://www.businessweek.com/news/2012-03-20/wal-mart-gears-up-online-as-customers-defect-to-amazon.
Bruce Upbin, "Why Best Buy CEO Brian Dunn Had to Quit," Forbes, Apr. 10, 2012. http://www.forbes.com/sites/bruceupbin/2012/04/10/why-best-buy-ceo-brian-dunn-had-to-quit/.
John Quain, "Should you 'Showroom'—Shop in Stores, Buy Online—Your Next Gadget?" foxnews.com, Apr. 18, 2012. http://www.foxnews.com/scitech/2012/04/18/ethics-showrooming-and-what-to-do-about-it/.
Search Report issued on Sep. 27, 2013 in corresponding PCT Application No. PCT/US2013/044905.
International Preliminary Report on Patentability and Written Opinion issued on Dec. 24, 2014 in corresponding PCT Application No. PCT/US2013/044905.

\* cited by examiner

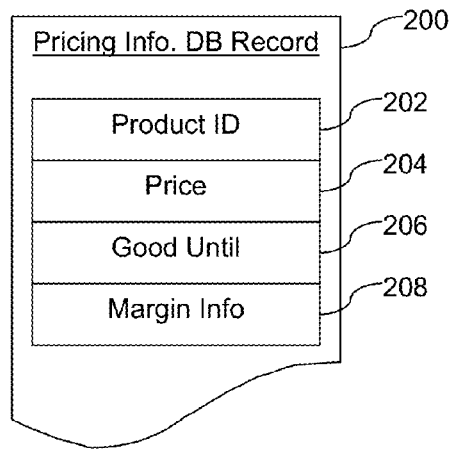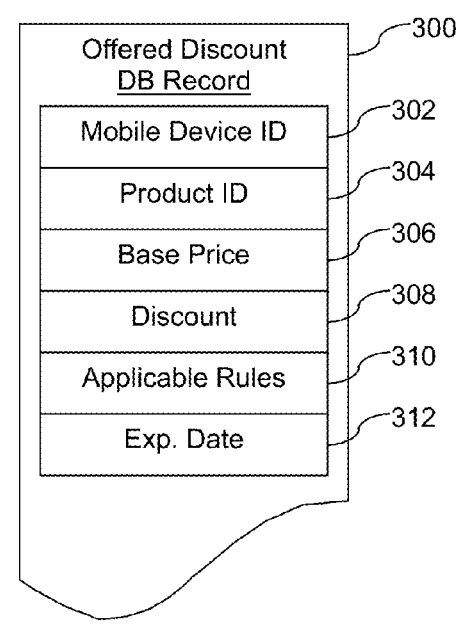
Fig. 2
Fig. 3

SYSTEMS AND/OR METHODS FOR MANAGING "SHOW-ROOMING" PRACTICES

TECHNICAL FIELD

The technology disclosed herein relates to techniques for managing "show-rooming" practices of consumers, e.g., where consumers interact with a product at a sometimes convenient brick-and-mortar location, only to later purchase the product from a different (and typically online) provider. More particularly, the technology disclosed herein relates to techniques for presenting distinct special offers (e.g., in the form of price adjustments) to potential show-rooming consumers, e.g., via a mobile device operated by these consumers. In certain exemplary embodiments, the distinct special offers may be generated based on, for example, pricing information gathered from competitors, rules specified by the brick-and-mortar location, characteristics or habits of a particular consumer using a particular device, recent trends, etc.

BACKGROUND AND SUMMARY

Showrooms have been around for years and have been used to promote many different kinds of products and/or services. Indeed, showrooms are common for automobiles, bathroom and kitchen design services and associated products, etc. "Specialty stores" have begun to appear in the last few years to showroom mobile phones and/or other devices, products specific to a particular manufacturer, etc. Perhaps more basically, however, virtually every brick-and-mortar store is in essence a showroom, as a potential broad array of products are presented for potential consumers. Indeed, although e-tailers, web-based storefronts, online portals, and the like have become very popular, many people still like the experience of going to a physical brick-and-mortar store. The experience of browsing a showroom is important for some, because they can actually touch the product before deciding whether to purchase it, view products side-by-side (e.g., televisions, electronic, etc.), and/or interact with a "real live person" (e.g., a sales clerk, etc.) to ask questions, get feedback or receive recommendations, etc.

The advent of the Internet and other information technologies has led to more information being available in a faster and sometimes more efficient manner. For example, a potential consumer can "shop online" and determine which store has the best price on a particular product, potentially balancing factors like base price, sales and/or use tax to be paid (if any), shipping and handling charges (if any), etc. In fact, currently available online and/or mobile device tools such as RedLaser, PriceGrabber, PriceSpider, and the like, help provide product pricing information for a variety of different stores. Even some product review websites (such as, for example, CNet) provide similar price comparison tools for the products that they are reviewing.

As a result, the practice of "show-rooming" has become a major hurdle for brick-and-mortar stores. A person may be aware of a product he/she would like to purchase or may simply be browsing through a brick-and-mortar store's goods with no particular purchase motive in mind. The person may treat the brick-and-mortar store as a showroom to, among other things, try out a product, seek advice, etc. But instead of buying a seemingly suitable product right away, the person may already know that the product is available elsewhere for a better price, or may later search for the best price available. The above-mentioned and/or other tools make competitive pricing more transparent to would-be consumers. Thus, many brick-and-mortar stores essentially lose out on potential sales. Indeed, an Apr. 10, 2012 article in Forbes entitled "Why Best Buy CEO Brian Dunn Had To Quit," argues that "Competitive advantages you [brick-and-mortar stores] once had are gone. Price is transparent. Service and repair are not the refuges they once were." In some cases, service contracts and the like offered by brick-and-mortar stores are insufficient to justify the sometimes higher prices.

A 2011 InsightExpress study found that 59% of U.S. smart phone owners have comparison-shopped while actually in the store. According to a more recent Feb. 22, 2012 survey from market research firm ClickIQ, consumer panel members revealed that 67% have shopped online as well as in brick-and-mortar stores during the past six months. The group members were asked whether they had researched a product while actually at the local retail store and then made the purchase online, and 46% indicated that they had done so. Eighty-seven percent of the panel members said that price was the main reason for having made the purchase online.

Given this evidence, it is apparent that show-rooming is presenting a number of challenges to traditional brick-and-mortar retailers. There also is a concomitant race to develop technology-based solutions that either help consumers find better deals elsewhere, or alert consumers after the fact (e.g., after they have made their purchase), that a price reduction has taken place by the retailer they have made their recent purchase from, or that a competitor has reduced its price on the item they have purchased. This has given rise to the above-described and other applications. However, a Fox News article by John R. Quain published on Apr. 18, 2012, entitled "Should you 'showroom'—shop in stores, buy online—your next gadget?" notes that shopping is possible everywhere and argues that "retailers need to recognize this fact and use the technology to reach customers in novel ways. Specific store apps with rewards and notices of upcoming sales can help. But more innovative approaches will be needed."

Thus, it will be appreciated that there is a need in the art for technology-based solutions to show-rooming practices. For instance, it will be appreciated that it would be desirable to provide retailers, manufacturers, and others, the ability to counter the "price transparency" revolution and continue to compete on price/value offers, e.g., via individually tailored "distinct special offers."

In certain exemplary embodiments, a system for providing custom offers to consumers is provided. An electronic device includes at least one processor that executes an application comprising instructions that cause the application to at least: receive an identifier of a product of interest; determine a first price of the product of interest, with the first price being a price ordinarily charged by a first seller; initiate, in connection with the identifier, a price lookup query to determine pricing information from a plurality of other sellers different from the first seller, for the same and/or similar product(s) as the product of interest; and display a custom offer when the first price is higher than a price charged by one or more of the other sellers, with the custom offer being redeemable in connection with the first seller only.

In certain exemplary embodiments, there is provided an electronic device including at least one processor that executes an application for providing custom offers to a consumer. The application comprises instructions that cause the application to at least: receive an identifier of a product of interest; determine a first price of the product of interest, the first price being a price ordinarily charged by a first seller; initiate, in connection with the identifier, a price lookup query to determine pricing information from a plurality of other sellers, different from the first seller, for the same and/or similar product(s) as the product of interest; and display a custom offer when the first price is higher than a price charged by one or more of the other sellers, with the custom offer being redeemable in connection with the first seller only.

In certain exemplary embodiments, a method of providing custom offers to a consumer is provided. An identifier of a product of interest is received from an electronic device including at least one processor that executes an application. A first price of the product of interest is determined, with the first price being a price ordinarily charged by a first seller. A price lookup query is initiated, in connection with the identifier and the electronic device, to determine pricing information from a plurality of other sellers different from the first seller, for the same and/or similar product as the product of interest. A custom offer is caused to be displayed via the electronic device when the first price is higher than a price charged by one or more of the other sellers, with the custom offer being redeemable in connection with the first seller only.

Programmed logic circuitry may include, for example, any suitable combination of hardware, software, firmware, and/or the like. A computer-readable storage medium may include, for example, a disk, CD-ROM, hard drive, and/or the like, and thus may be transitory or non-transitory in nature. Instructions may be stored on a non-transitory computer readable storage medium that, when executed (e.g., by a processor of one or more computers or computer systems), perform the methods described herein.

There are a number of advantages that are made possible in connection with the exemplary techniques disclosed herein. For example, the "meet or beat" price ability of certain exemplary embodiments may provide an omni-channel customer tie-in, e.g., by presenting the user with some small credit (potentially, say, $5 or $10) to be used as a gift certificate for an online purchase, or other indicia of value. Thus, it is possible to bridge the gap between online and in-store experiences, thereby providing a helpful resolution to show-rooming problems while also taking advantage of the fact that, as shown by recent studies, the most valuable customers are those customers who shop both online and in stores.

Another advantage relates to the fact that customized special offers are better than "price guarantees" (which typically last some short period such as, for example, one week or 30 days). The approaches of certain exemplary embodiments are more convenient for customers who might otherwise forget or find it difficult to make it back to a store with the required documentation (e.g., receipt, competitor advertisement, etc.). They also may be more helpful to stores by encouraging more immediate purchases or even subsequent purchases through an associated online portal.

Still another advantage relates to the fact that in-store display prices, online prices, advertised prices, and/or the like, are not being altered. Instead, the distinct special offer is made for a particular user. Thus, there is not necessarily an obligation to make the same offer available to others, or even the same person after an initial offer is made once and/or expired after some predefined period.

The exemplary embodiments, aspect, and advantages described herein may be used in any suitable combination or sub-combination such that it is possible to obtain yet further embodiments of the instant invention.

BRIEF DESCRIPTION OF THE DRAWINGS

Aspects and characteristics of the exemplary illustrative non-limiting implementations will become apparent from the following detailed description of exemplary implementations, when read in view of the accompanying drawings, in which:

FIG. 2 is an example pricing information database record in accordance with certain exemplary embodiments;

FIG. 3 is an example offered discount database record in accordance with certain exemplary embodiments;

FIG. 10 is a flowchart showing a process for enabling manufacturers to leverage the techniques of certain exemplary embodiments in connection with a participating retailer or the like.

DETAILED DESCRIPTION

It will be recognized by those of ordinary skill that modification, extensions and changes to the disclosed exemplary implementations may be made without departing from the scope and spirit of the invention. In short, the present invention is not limited to the particular forms disclosed herein.

Certain exemplary embodiments relate to an application for an electronic device (e.g., a smart phone, tablet, or other device) that helps address the show-rooming dilemma for brick-and-mortar stores, where consumers exploit their store and/or staff to acquire merchandise familiarity, only to then buy products on-line from competing ecommerce sites. Certain exemplary embodiments attempt to accomplish this by encourage customers who are browsing (show-rooming) in a store to actually buy from that store or the very same retailer's ecommerce site.

In certain exemplary embodiments, a participating brick-and-mortar store is provided with an opportunity to intervene in a substantially real-time manner to offer an instant price adjustment of its own, e.g., to either match or beat a competitor's price/offering, and potentially before the consumer is directed to a multitude of ecommerce competing retailers (or traditional competing retailer websites). This may be accomplished by having an application running on a mobile device in a retail location initiate a search of other sellers' prices, determine whether it is possible for the retail location itself to offer a discount on the product and, if so, then offering a customized discount immediately to the mobile device user via the mobile device. Optional analysis may be performed, e.g., on ongoing bases, to determine the "optimal" discount that both reduces the retailer's erosion of revenue/profit and yet still results in the show-rooming customer buying the products.

Figure 1:
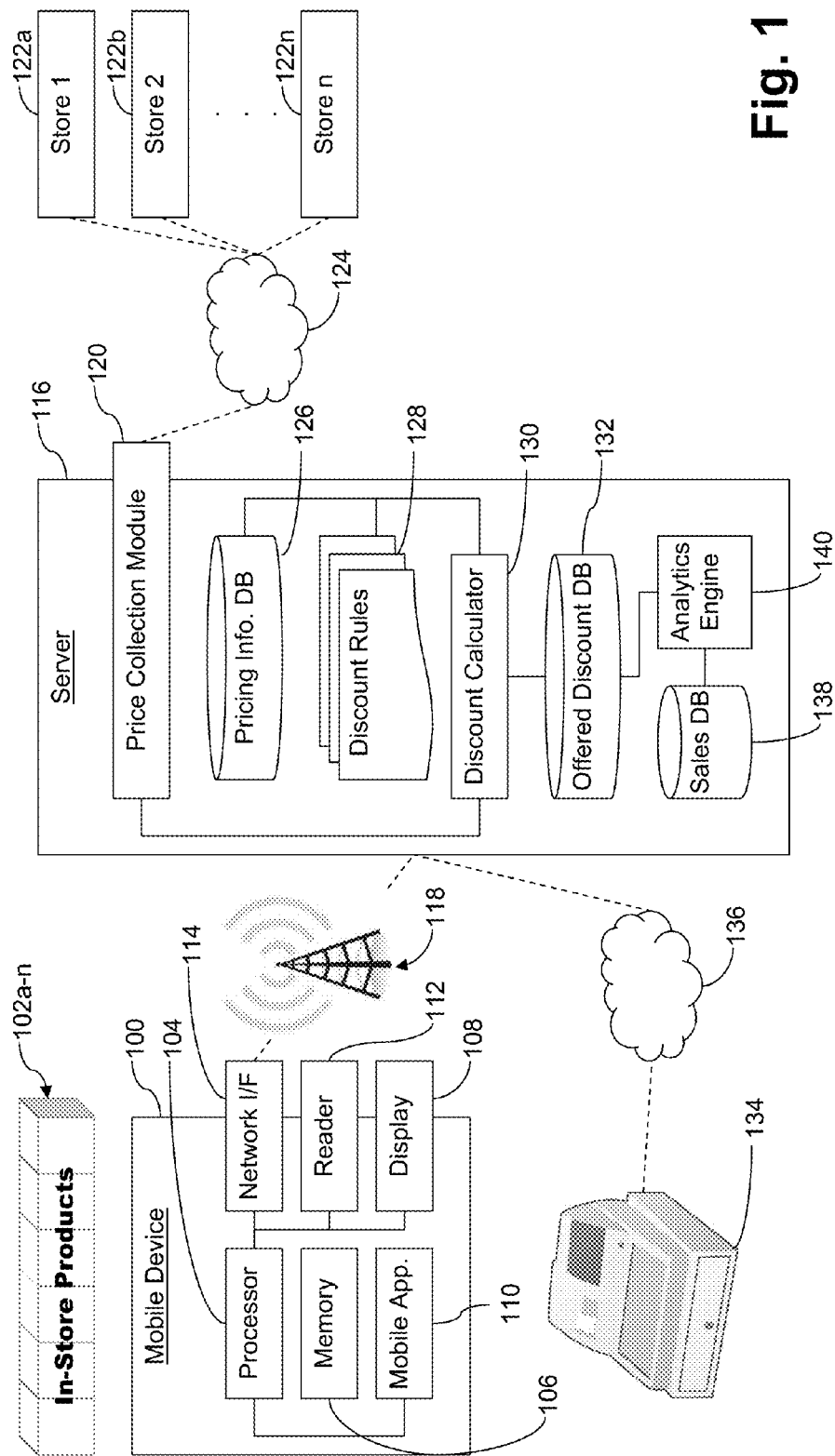
FIG. 1 is a schematic view of a system for managing show-rooming activities, according to certain exemplary embodiments.

Referring now more particularly to the drawings, FIG. 1 is a schematic view of a system for managing show-rooming according to certain exemplary embodiments. As shown in FIG. 1, a user operating a mobile device 100 (e.g., a mobile phone, tablet, PDA, computer, or other electronic device) is in a retail location, perhaps browsing in-store products 102*a*-102*n* that are on display for possible spontaneous purpose, with the specific intent of show-rooming, etc. The mobile device 100 includes processing resources such as, for example, at least one processor 104 and a memory 106. The processing resources may control an operating system, e.g., to provide output to the display 108 (which may be a LCD, OLED, or other suitable display device type, integral with or otherwise connected to the mobile device 100). A non-transitory computer readable storage medium (e.g., a disk drive device, solid state device, flash memory, and/or the like) also may be provided to the mobile device 100, e.g., for storing the operating system and a mobile application 110. As described in greater detail below, the mobile application 110 may be operable by the user to "comparison shop" for products of potential interest, and to present individualized offers, promotions, coupons, or the like to the user, as appropriate. It will be appreciated that the mobile application 110 of certain exemplary embodiments may be "branded" for a particular retailer, manufacturer, product line, and/or in some other fashion. The reader 112 of the mobile device 100 may enable the user to obtain identifying information regarding a product of potential interest. For instance, the reader 112 may be a 2D, 3D, or other barcode scanner, a camera that enables barcodes to be captured and interpreted (e.g., with the aid of the at least one processor 104, etc.), an EPC/RFID reader, a NFC device, etc.

For instance, in certain exemplary embodiments, the mobile application 110 may use a network interface 114 of the mobile device 100 to connect to a server 116, which may be located remote from the store, via a first network 118. The first network may be, for example, a wireless (WI-FI) network, 3G, 4G, LTE, or other suitable network. The server 116 may include hardware components such as, for example, at least one processor, a memory, a non-transitory computer readable storage medium, etc. These components may cooperate with one another to enable a price collection module 120 to access pricing information from a plurality of different stores 122a-122n, e.g., via a second network 124 (which may be, for example, the Internet or other suitable network). The price collection module 120 may be responsible for gathering pricing information for products of potential interested to the user of the mobile device 100. Such items may include, for example, products read, scanned, or otherwise identified using the reader 112 of the mobile device 100, known comparable products (e.g., name-brand products when generics are read, generics when name-brand products are read, competitive offerings, etc.). The price collection module 120 may operate similar to currently available price comparison tools (such as, for example, PriceGrabber), and may obtain pricing data from databases of the individual stores, from a centrally maintained database, by screen-scraping or other techniques, etc.

The pricing information database 126 may include pricing information for products specific to the store in which the user is located. For instance, FIG. 2 is an example pricing information database record 200 in accordance with certain exemplary embodiments. The pricing information database record 200 may include, for example, a product identifier 202 (e.g., a UPC, EPC, EAN, JAN, or other identifier), together with the price of the product 204, and the information concerning how long that price is good for 206 (e.g., until the end of the week, a date certain, until it is updated manually, etc.). Optionally, margin information 208 may be stored, e.g., so that there is some indication of how much profit can be made and, thus, how much price flexibility might be possible in some cases. In certain circumstances, a custom offer may be made so that the final price is below cost (e.g., it may be a so-called "loss leader"), e.g., to help lock-out competition. Thus, in some cases, offers may be made that are greater than the margin.

Referring once again to FIG. 1, one or more discount rules 128 may be specified for the server 116. These discount rules may include criteria indicating when an offer that comes close to, meets, or beats, a competitor should be generated. These rules may be specified on a competitor-by-competitor basis in certain instances, e.g., such that better offers are provided as against one or more predefined fierce competitors, such that worse offers are provided as against one or more predefined competitors from whom the user of the device 100 is unlike to buy (e.g., because they are far away, known to offer poor service or charge high shipping rates, etc.), etc. The rules also may indicate tolerances for how much of a discount to apply, e.g., such that a predefined discount is always offered, a better offer from a competitor is always beaten by a predefined amount, the amount offered never exceeds the expected profit margin (e.g., as indicated in the pricing information database 126) or a percentage thereof, etc. These rules also may be user specific. For example, the mobile device user may be known (e.g., through a loyalty program and/or other types of user registration), and/or the mobile device itself may be recognizable. Thus, it may be desirable in certain instances to offer subjectively or objectively qualified "good customers" better deals (e.g., to reward them for their loyalty, etc.), subjectively or objectively qualified "bad customers" worse deals (e.g., because they are known to shop elsewhere, frequently return products, etc.), to offer subjectively or objectively qualified good customers worse deals (e.g., because they might be expected to make the purchase at the location, regardless), to offer subjectively or objectively qualified bad customers better deals (e.g., to incentivize them to become better customers), to prevent certain users from "over-using" the discount system, etc. In some cases, the determination as to whether to offer a discount and/or the amount of the discount (e.g., within a predetermined range) may be random. Rules also may be tailored for products, product types, regional differences, and/or the like.

A discount calculator 130 may receive information from the price collection module 120, the pricing information database 126, and/or the discount rules 128, and arrive at a particular discount to be offered. This particular discount may be stored to the offered discount database 132. In that regard, FIG. 3 is an example offered discount database record 300 in accordance with certain exemplary embodiments. As alluded to above, the record 300 may be specific for a particular use/user/mobile device. Thus, a mobile device or other identifier 302 may be a key field in certain example implementations. The product identifier 304 may be stored, along with the base price 306, the discount to be applied 308, the applicable rules 310 that were used in formulating the particular discount 208, and an expiration date 312 for the offer (which may be specified as a date/time certain, as a relative matter, etc). A link to the pricing information database 126 and/or information gathered by the price collection module 120 also may be provided in some cases, e.g., to help keep track of how the discount was generated.

Returning yet again to FIG. 1, the server 116 may communicate the offer to the mobile device 100, substantially in real-time, back over the first network 118. With this offer, the user may be incentivized to purchase the product of interest from the retailer or from an online portal operated by the retailer, as opposed to from another party. If the purchase is made using the point-of-sale (POS) register system 134 of the retail location, information concerning the sale may be sent to the server 116 via the network connection 136 (which may in some instances be an Internet, WAN, LAN, or other connection). This information may be stored for electronic registration (ER) purposes, e.g., to help ensure that returns/warranty requests are processed appropriately (e.g., such that they account for the discount applied). ER systems are disclosed in, for example, U.S. Pat. Nos. 5,978,774; 6,018,719; and 6,085,172, the entire contents of which are hereby incorporated herein by reference.

The information transmitted from the POS register system 134 to the server 116 also may be used for subsequent analytical purposes. For example, a sales database 138 may store information concerning the original price, the discount amount, the mobile device, etc., and/or may include links back to the pricing information database 126, the offered discount database 132, and/or the information gathered by the price collection module 120. This information may be analyzed by the analytics engine 140, e.g., to help the application, backend system supporting the application, and/or a specific retail location determine the "sweet spot" for converting potential show-rooming users to actual buyers, while offering only a modest price reduction.

Figure 4:
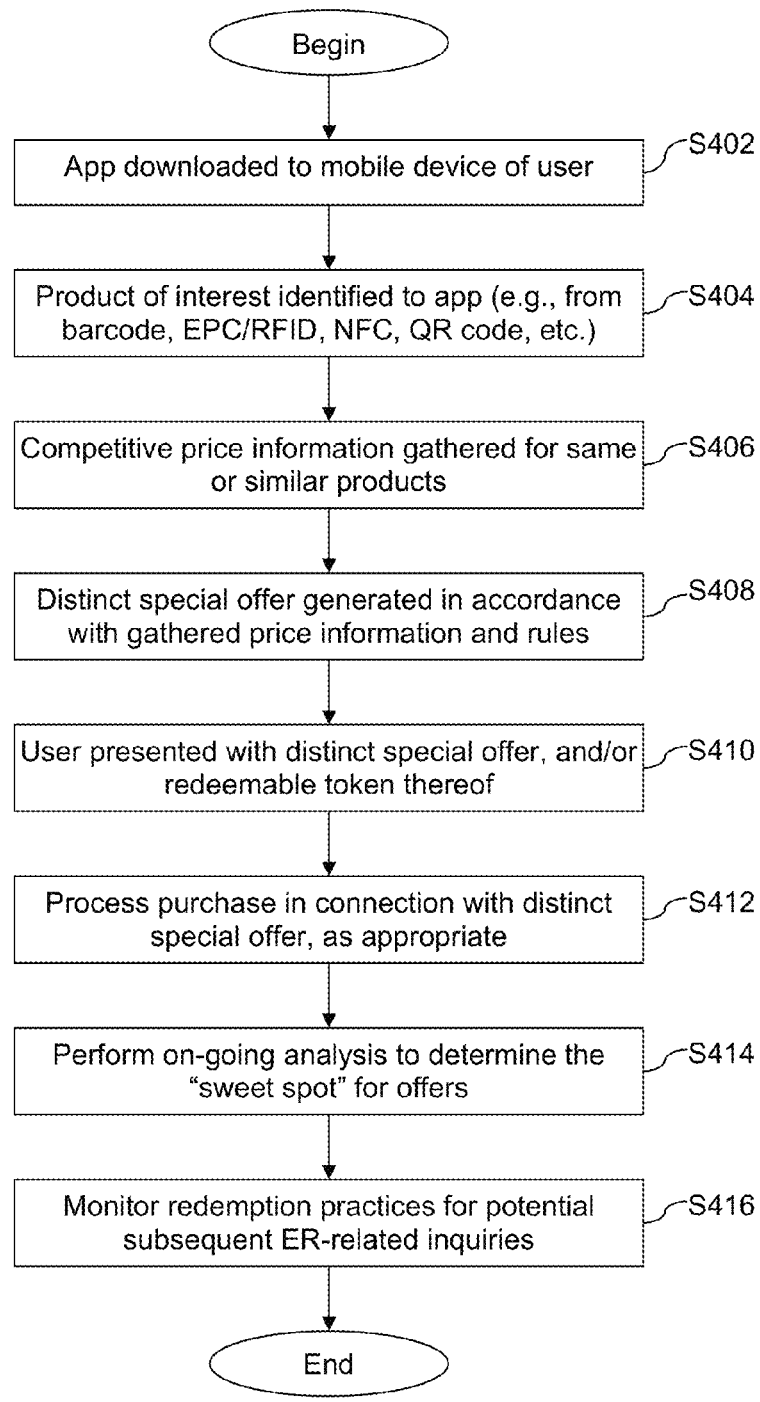
FIG. 4 is a flowchart of an example process for managing show-rooming activities, according to certain exemplary embodiments.

FIG. 4 is a flowchart of an example process for managing show-rooming activities, according to certain exemplary embodiments. In step S402, an application is downloaded to a mobile device of the user. The application may be tailored to a specific store, chain of stores, brand, manufacturer, and/or the like. In some cases, the user may be charged a fee for the application, although this need not necessarily be the case in all instances. The user can shop at locations and access the application using the mobile device.

In step S404, a product of interest is identified to the application. For example, a customer who is in a participating brick-and-mortar retail store and is viewing a product (and potentially show-rooming) may scans an item's barcode, shelf barcode, EPC/RFID tag, NFC tag, or the like, e.g., to initiate a price check/comparison as between the store's price and other competing retailers. QR (Quick Response) codes, which often are two-dimensional barcodes, also have become quite popular and can be customized by the participating retailer or by a supplier to a variety of information such as, for example, retailer name/ID (e.g., Store-Mart Store #100), the SKU item number, etc. Certain exemplary embodiments may benefit from knowing the customer's location, that the customer is actually in a physical store, and the specific store that the user is in, e.g., as prices sometimes vary by store in a chain, region, etc. As indicated above, this location information may be embedded in a QR code, and it also could possibly be embedded in an EPC/RFID or NFC tag, etc. There are other techniques that can be used in addition, or in the alternative, to determine the user's location. Such techniques may include, for example, using the device's built-in GPS features (if any), using a wireless or cellular network to triangulate the approximate location of the individual (and potentially cross-referencing with a directory of known locations), etc. It will be appreciated that the location services (e.g., GPS or other functionality) of a smart phone or other electronic device may need to be enabled to serve these and/or other purposes. In this regard, the application may in some example embodiments perform a check to determine whether such features are enabled for the device in general and/or the application in particular, and prompt the user to make any changes, as needed.

Competitive price information is gathered for the same and/or similar products in step S406. PriceGrabber, PriceSpider, etc., currently gather such information, and certain exemplary embodiments may use the same and/or similar techniques (e.g., after search for or otherwise locating one or more competitor websites that sell the identical or similar item that is being viewed by the customer in the store). That is, certain exemplary embodiments may rely on a pre- or custom-built database that includes at least pricing and store information, screen or other scraping techniques, etc. Other cost-related metrics also may be gathered or known in advance (e.g., it is generally known that most Amazon.com purchases over $25 qualify for free standard shipping), with such metrics possibly including, for example, shipping and handling information, tax information, etc. Still other information may be gathered such as, for example, number of days before delivery, available for in-store pickup, etc. This information, and potentially the other cost-related metrics, may be value-added offerings (e.g., for which the mobile application user is charged a premium). In certain exemplary embodiments, the application may be customizable to direct customers to predetermined competitors or via general search rankings.

Figure 5:
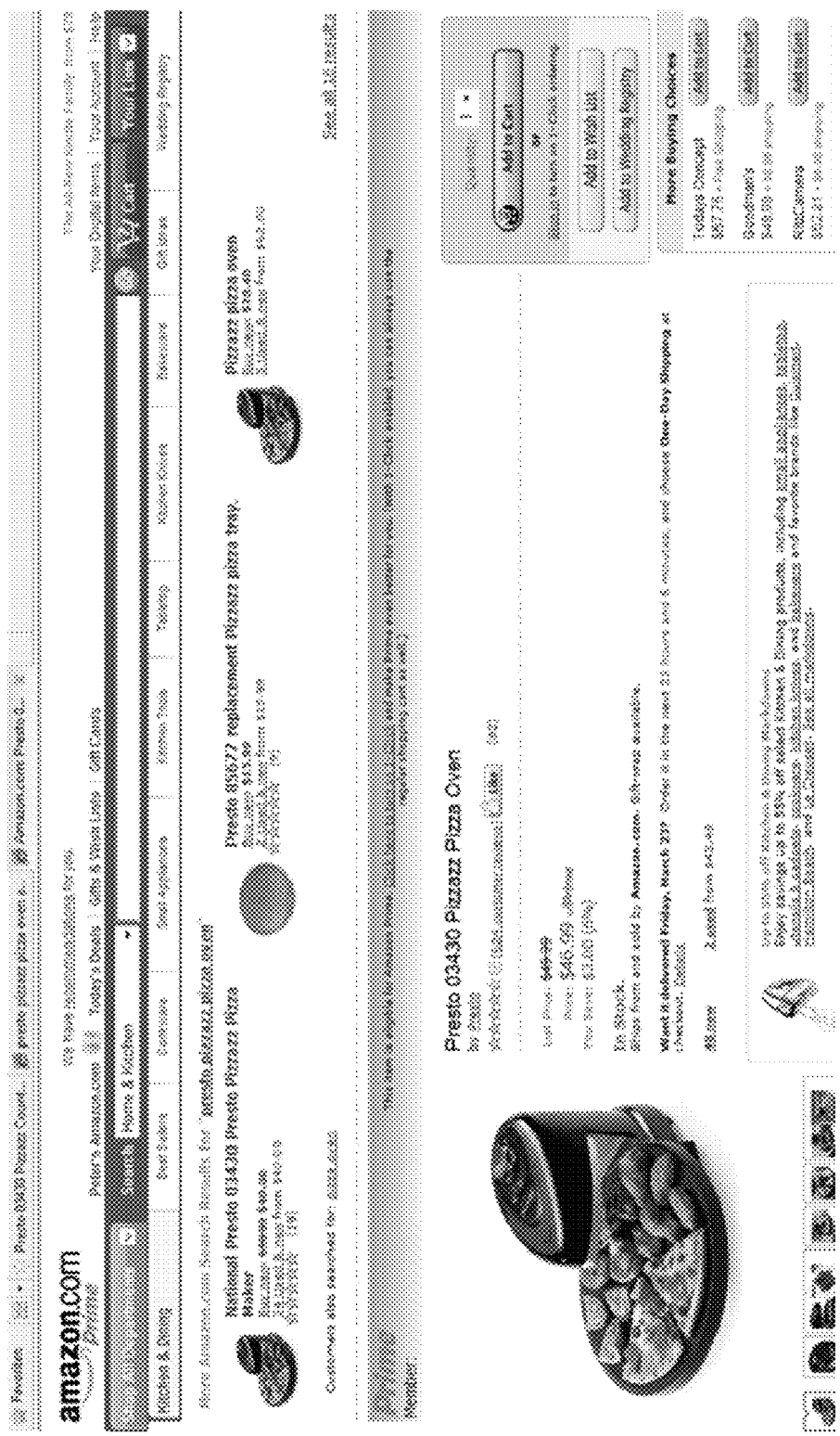
FIGS. 5-7 illustrate the price differential for several retailers for an example product.
Figure 6:
Figure 7:
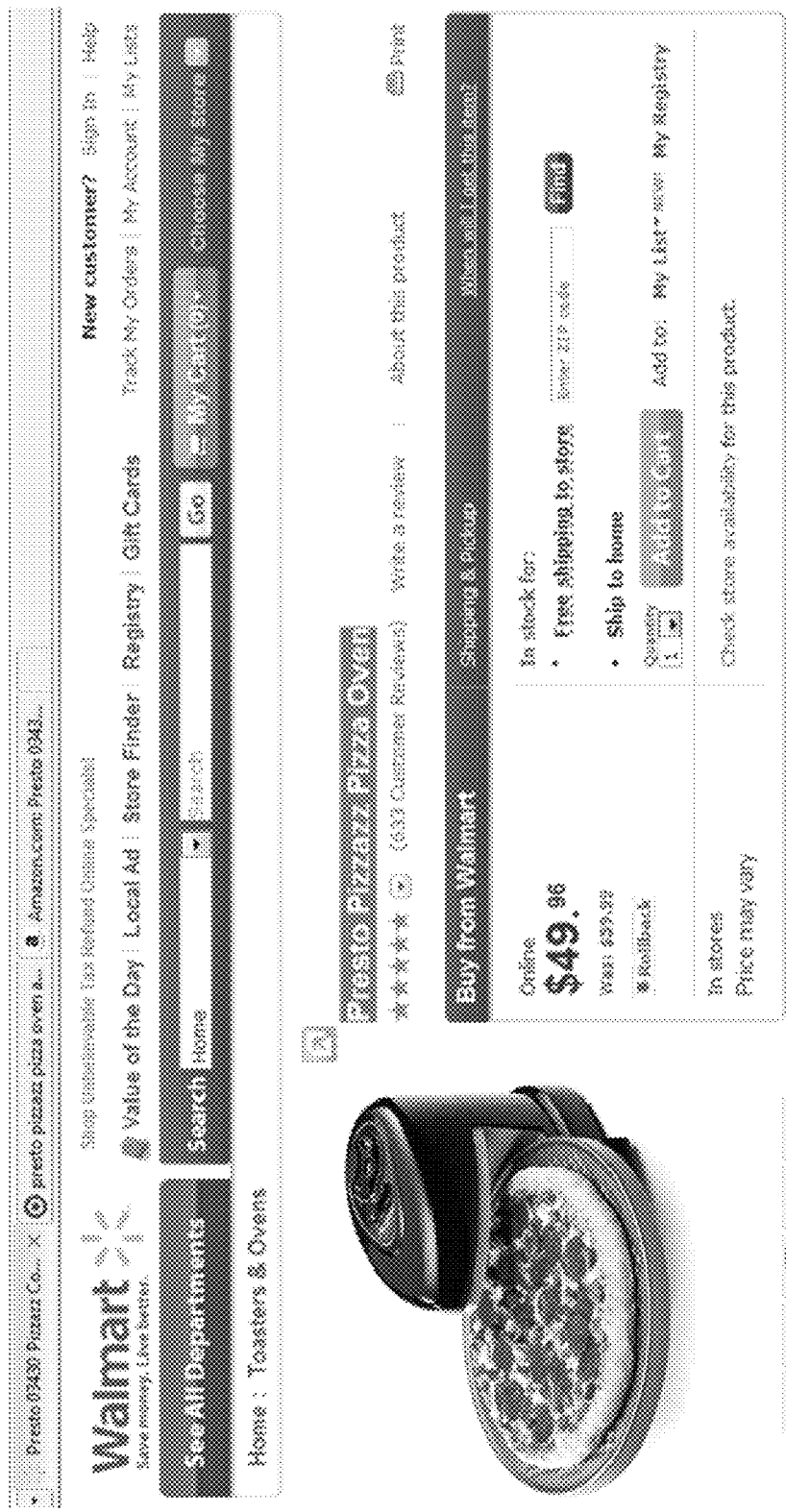

FIGS. 5-7 illustrate the price differential for several retailers for an example product. More particularly, FIG. 5 shows that this particular Presto Pizzazz Pizza Oven is available directly from Amazon.com for $46.99+$0.00 shipping. Displayed in the lower right are additional Amazon.com reseller partners, along with the price and shipping charges (i.e., "Today's Concept" $57.76+$0.00 Shipping, Goodman's $49.99+$8.95 Shipping, Ritz Camera $52.21+$6.95 Shipping). In this particular scenario, Amazon.com's (total) value proposition, including the price and the cost of shipping, is $46.99. FIG. 6 shows that the very same Presto Pizzazz Pizza is available at Target.com for $59.99+$0.00 Shipping. Target.com's (total) value proposition thus is $59.99. FIG. 7 shows that the same Presto Pizzazz Pizza Oven also is available at walmart.com for $49.96+$0.00 shipping. For the purpose of this illustration, it is assumed that Wal-Mart's store price is the same, although they could vary. Wal-Mart's (total) value proposition therefore is $49.96, making it the second best value proposition, next to Amazon.com's.

In step S408 (e.g., possibly after locating and determining competitors' prices, but before the information is presented to the customer), based on certain predetermined parameters, a "distinct special offer" may be calculated to "meet or beat" the competitors. This distinct special offer may be available at the retailer's store. In other cases, the distinct special offer additionally or alternatively could apply to on-line purchases made via a virtual storefront for the specific retailer or the like. It is noted that terms like "distinct special offer," "custom offer," etc., are used herein in generally interchangeable manners.

It is noted that prior to displaying/presenting the information/offers to the customer, it may be determined whether the retailer's own net offer is equal or superior to the competitors'. See the examples shown in FIGS. 5 and 6, versus the example shown in FIG. 7. If the retailer's own offer is higher/not competitive (e.g., FIG. 7 versus FIG. 5), the competitors' offerings may be matched or undercut with a custom-generated "distinct special offer," e.g., by lowering the retailer's own price. The net price may in certain exemplary embodiments be the relevant figure to adjust, with the net including possible shipping and handling fees, taxes, etc. The adjustment may be made in some cases by applying a predetermined percentage or actual discount off the lowest competitor's NET price, by including a free product accessory (e.g., worth some predetermined amount of money such as, for example, $5.00), by providing an in-store or on-line gift certificate, etc. The distinct special offer in some cases may be presented as a customer appreciation gesture for visiting a store, for buying from its physical store or via its own on-line channel, etc. It will be appreciated that the processing of competitive pricing information may be accomplished on a computer system remote from the device and/or on the device itself, in different exemplary embodiments. It similarly will be appreciated that the determination of the distinct special offer may be accomplished on a computer system remote from the device and/or on the device itself.

Referring once again to FIG. 4, in step S410, once the downloaded information has been processed, the application may display the competitors' net offers or other associated pricing information, together with the determined "distinct special offer" and/or total net price as noted that, by design, may be equal to or better than the other offers. The distinct special offer may be presented as a redeemable token that may be human and/or machine readable. For example, to facilitate the purchase of the item viewed in the store, and for the purpose of redemption and/or tracking of the distinct special offer (e.g., in-store and/or on-line), a code number or the like that represents the detail of the distinct offer can be generated and represented electronically. For instance, a barcode, QR code, NFC program code, and/or the like may be generated and displayed together with explanatory text, e.g., on the device. The barcode or QR code could be scanned at a POS register, a human-readable number could be entered by a store clerk or typed in by the mobile device user (e.g., in connection with an online purchase), etc.

In some cases, the distinct special offer may be emailed, SMS or MMS messaged, mailed, or otherwise delivered to the mobile device user. For instance, the application may in certain exemplary embodiments incorporate an automated feature that allows the customer to remember/save the code number (or voucher/coupon), e.g., by auto-texting or emailing the code number to themselves, along with product information and the offer detail, for possible subsequent redemption or simply for their records.

Figure 8:
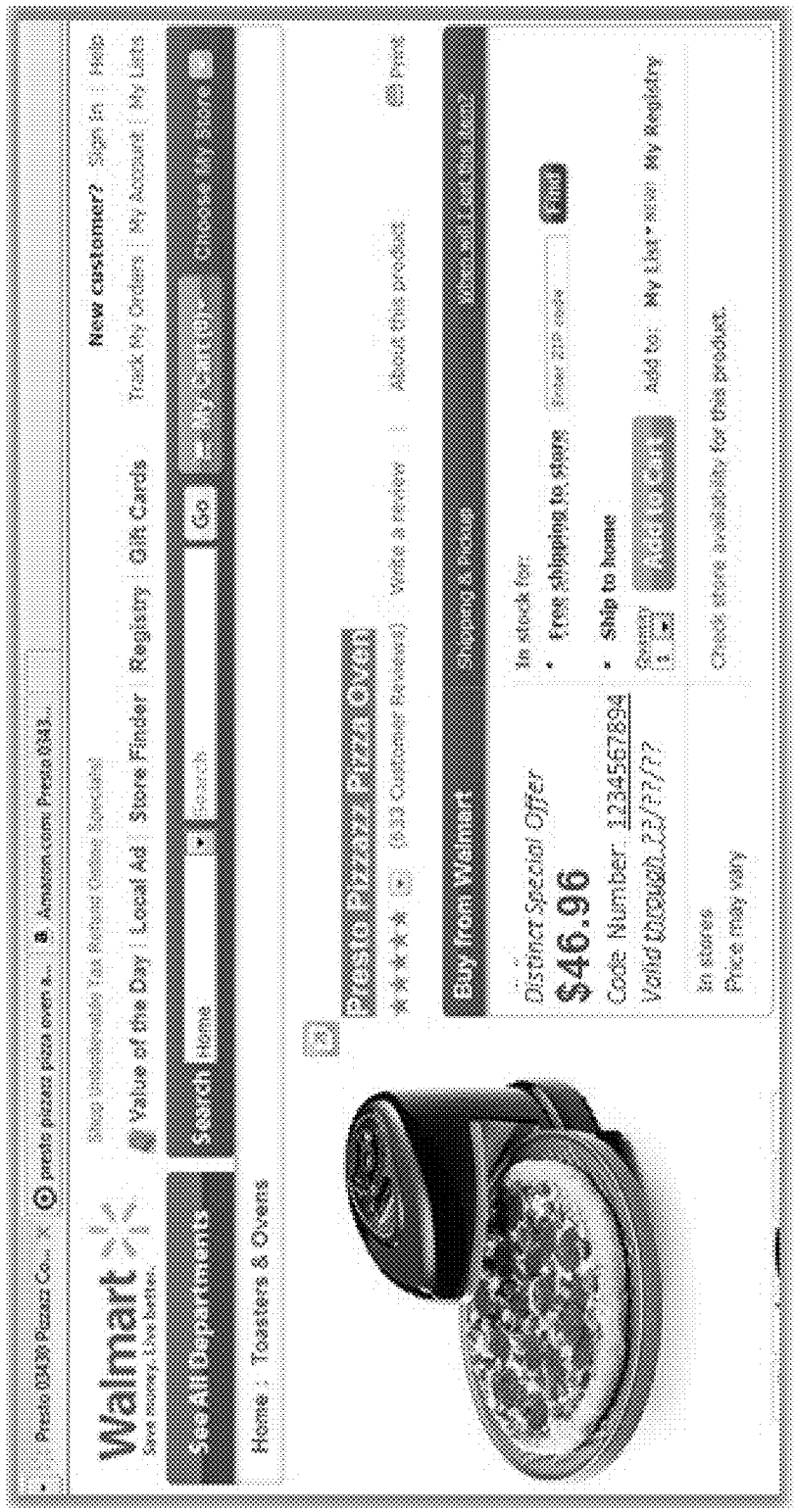
FIG. 8 is an exemplary screenshot including a distinct special offer generated in accordance with certain exemplary embodiments.

FIG. 8 is an exemplary screenshot including a distinct special offer generated in accordance with certain exemplary embodiments. As shown in FIG. 8, in response to the information gathered from FIGS. 5-6, the retailer's price is reduced by $3.00 to $46.96. The show-rooming customer browsing in the store would only be presented with this offer, and not the standard offer as shown in FIG. 7. As can be seen from the FIG. 8 example, a code number is generated (e.g., for in-store and/or possible subsequent online redemption), and an expiration date could possibly be provided. Of course, it will be appreciated that other designs for the distinct special offers may be provided in different implementations, and such designs may include this and/or other different information.

It will be appreciated that the distinct special offer may be registered with a central database that tracks the distinct special offers and potentially stores information concerning, for example, the user and/or device for whom the offer was generated, the product to and/or store at which the offer applies (e.g., the SKU number, UPC, or other unique or non-unique identifier viewed), date/time the offer was generated, an expiration date for the offer, whether the offer is redeemably in-store and/or online, and/or the like. Other pertinent information (e.g., competitor offers searched and found, the rules used in creating the discount, etc.) also may be stored.

Additionally, for anti-fraud and/or security measures, the code number may incorporate a check digit created using an appropriate algorithm and/or in accordance with a known mask. See, for example, U.S. Pat. No. 6,947,941 and U.S. Publication No. 2011/0251911, the entire contents of which are hereby incorporated herein by reference. Registering the special distinct offers in a central database may be used to reduce the likelihood of fraudulent purchase and/or return/warranty transactions, e.g., by treating the offers as if they were buyer reward program bonuses, gift card purchases, and/or the like, and by implementing the techniques disclosed in any one or more of U.S. Publication Nos. 2012/0078739 and 2012/0123845, as well as U.S. Application Ser. No. 61/522,966 filed Aug. 12, 2011. The entire contents of each of these references is hereby incorporated herein by reference.

When the customer makes the purchase in step S412, at the physical store or via an on-line order, the offer code number is entered (e.g., scanned, read, typed in, etc.), and the original record of the offer is retrieved. The price thus may be adjusted, a free give-away offered, etc., in accordance with the distinct special offer.

As shown in step S414, the system may perform certain analysis on an ongoing basis to determine an optimal distinct special offer value over the competitors' offers, e.g., in an effort to increase the opportunity to convert show-rooming customers into buying customers, while at the same time reducing the retailer's erosion of revenue/profit. In other words, the "distinct special offer" can be optimized (e.g., to determine the sweet spot as indicated above) to help ensure that the discount amount is sufficient enough to entice the customer to purchase the item, but not so great that it risks eroding profits unnecessarily. The starting discount amount over the competitor's lowest price can be very minimal or very generous, because certain exemplary embodiments include the ability to quickly determine what the appropriate discount amount should be.

Figure 9:
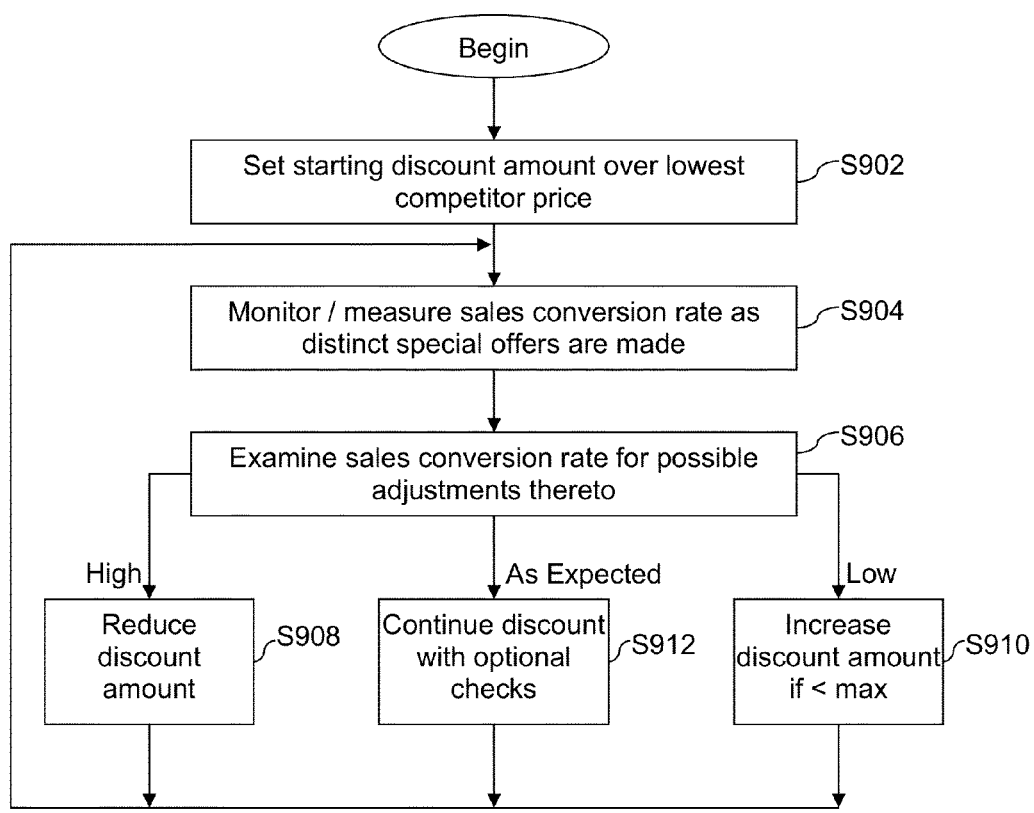
FIG. 9 is a flowchart showing an example process for determining the "sweet spot" in accordance with an exemplary embodiment.

FIG. 9 is a flowchart showing an example process for determining the "sweet spot" in accordance with an exemplary embodiment. The participating retailer (or the manufacturer of the brand, if they are the participant) predetermines a starting discount amount (e.g., a dollar amount and/or a percentage) over the lowest competitor price in step S902. In step S904, program logic running at a central or other location may monitor or measure the rate of sales conversions, which can be thought of in some cases as the number of show-rooming customers who have been issued a "distinct special offer" versus the number who have actually redeemed the "distinct special offer" and have made a purchase. Regardless of the conversion rate, but especially if it is substantially different from the expected value, an adjustment may be made so that the discount amount is adjusted accordingly. Thus, in step S906, the sales conversion rate is examined for possible adjustments thereto. For instance, if the conversion rate is too high (e.g., a greater than expected or desired number of people take advantage of the distinct special offer), then the discount amount will be adjusted downwardly for a predetermined amount of time in step S908. The conversion rate results may be monitored until a decrease in the conversion rate beyond a threshold level is observed. The discount rate may be locked in at the amount it was just before conversion rates dropped below the level.

On the other hand, if the conversion rate is too low (e.g., a lower than expected or desired number of people take advantage of the distinct special offer, potentially indicating that show-rooming is ongoing), the discount amount may be revised upwardly in step S910. A maximum dollar or percentage increase may be specified in some cases to make sure that the discount does not grow too large, and this maximum can be predetermined as an arbitrary amount, a percentage of actual or expected profit margin, etc. The conversion rate results may be monitored until it once again meets a certain threshold/expectation. The discount rate may be locked in at the amount where the conversion rate just began to level off or at the predetermined maximum amount (if set).

If the conversion rate stabilizes or remains constant for some period, the "optimal conversion rate" may be maintained in step S912. However, it also optionally be tested or verified by making minor adjustments to the offered discount rate. Fluctuations in conversion rates could be detected, e.g., as preferences change over time and/or for different products. Thus, if a drop or increase in buyer conversion is detected, adjustments can be made to restore the amount to the previous level. The FIG. 9 example analysis may be performed on an on-going and potentially dynamic basis, e.g., to help facilitate a rolling conversion rate versus discount calculation. This in turn may help to optimize sales, maximize profit, and retain and/or attract new customers.

It is noted that the parameters used in calculating the distinct special offer may vary by geographic areas (e.g., to take into account the differences between relatively richer areas and relatively poorer areas). Similarly, the parameters used in calculating the distinct special offer may vary for different product and/or different product types. Thus, different sweet spots may be appropriate for different areas, products, and/or product types. For instance, there may be more price flexibility for certain products as compared to other products, some people might be willing to accept a smaller discount on some products as compared to others, etc. Accordingly, certain exemplary embodiments may determine multiple sweet spots, e.g., for different regions, products, product types, etc.

It will be appreciated that the initial discount amount may be higher or lower than an expected sweet spot value. In so doing, it is possible to either err on the consumer purchase side or the business protection side.

Referring once again to FIG. 4, in step S416, customer redemption practices also may be tracked and monitored such that the correct amount is refunded or credited to the customer when a customer returns an item, etc. Example techniques for so doing are described in the patent documents identified above. This may help to reduce the likelihood of "wardrobing," whereby a customer purchases a product for a period of time with the intention of returning it possibly shortly thereafter (e.g., after the customer has made use of the product for a limited function or purpose), which potentially becomes even more attractive when distinct special offers are made available.

The FIG. 4 flowchart is an example process where a show-rooming customer is in a brick and mortar store utilizing an application where the retailer participates and may ultimately meet or beat competitor offerings. However, it will be appreciated that the techniques described herein are not so limited. For instance, while certain techniques may be performed in connection with a mobile device, the exemplary techniques described herein may be performed in connection with other devices such as, for example, computers that may be used in connection with home Internet-based shopping and/or the like.

Certain exemplary techniques also have potential applications for non-participating retailers. For instance, when a customer is show-rooming in a non-participating brick-and-mortar retailer's store and utilizes an application that incorporates some or all of the exemplary techniques described herein, the application may perform the above analytics but may instead direct the customer to one or more participating retailers (e.g., one or more brick-and-mortar stores, their online ecommerce sites, etc.), that either has a more favorable price offering or presents a "distinct special offer" in accordance with the exemplary techniques described herein. It thus will be appreciated that the custom offer need not necessarily be generated for the specific location that the user actually is in, in all exemplary embodiments. In addition, or in the alternative, in certain exemplary embodiments, multiple participating retailers/offerings and/or "distinct special offers" can be presented to the show-rooming customer, and the user thus can choose which offer is preferred (based on reputation, branding, convenience, etc.).

With respect to participating manufacturer(s) that cooperate with a participating retailer, certain exemplary embodiments may effectively provide a platform for manufacturers to compete amongst each other, e.g., to the benefit of the consumer, by offering instant discounts when show-rooming activities are detected on a product that is the same and/or similar to one of their own brands. The application can be configured to override the retailer's special offer in certain exemplary embodiments, e.g., and potentially present the manufacturer's offer/discount first, benefiting the retailer, who may elect to remain brand neutral if the retailer carries both brands.

When a customer is show-rooming and is utilizing an application that incorporates certain of the exemplary techniques described herein and views an item of interest (e.g., a Dell Obsidian Black Laptop 15.6 costing $488.00), a competing brand (e.g., a Samsung 15.6" Laptop PC costing $499.00) may be presented to the customer. Optionally, a customized discount (e.g., $20.00 off) may be generated and provided to the customer. The discount may be offered in connection with the approach described in FIG. 4 and/or variants thereof. However, the manufacturer may set the parameters of the discount rather than the retailer.

If the retailer chooses not to offer the instant discount to the customer at the time when the Samsung 15.6" Laptop PC is purchased, the customer may be able to redeem the $20.00 discount via the manufacturer (e.g., in the form of a rebate). Because of the terms and conditions set between the retailer and the manufacturer, the application may be configured in advance to direct the consumer to the manufacturer for the discount redemption for items purchased from this particular retailer. A variety of techniques may be used to facilitate the discount redemption, however, to help reduce the likelihood of fraudulent transactions associated therewith.

Figure 10:
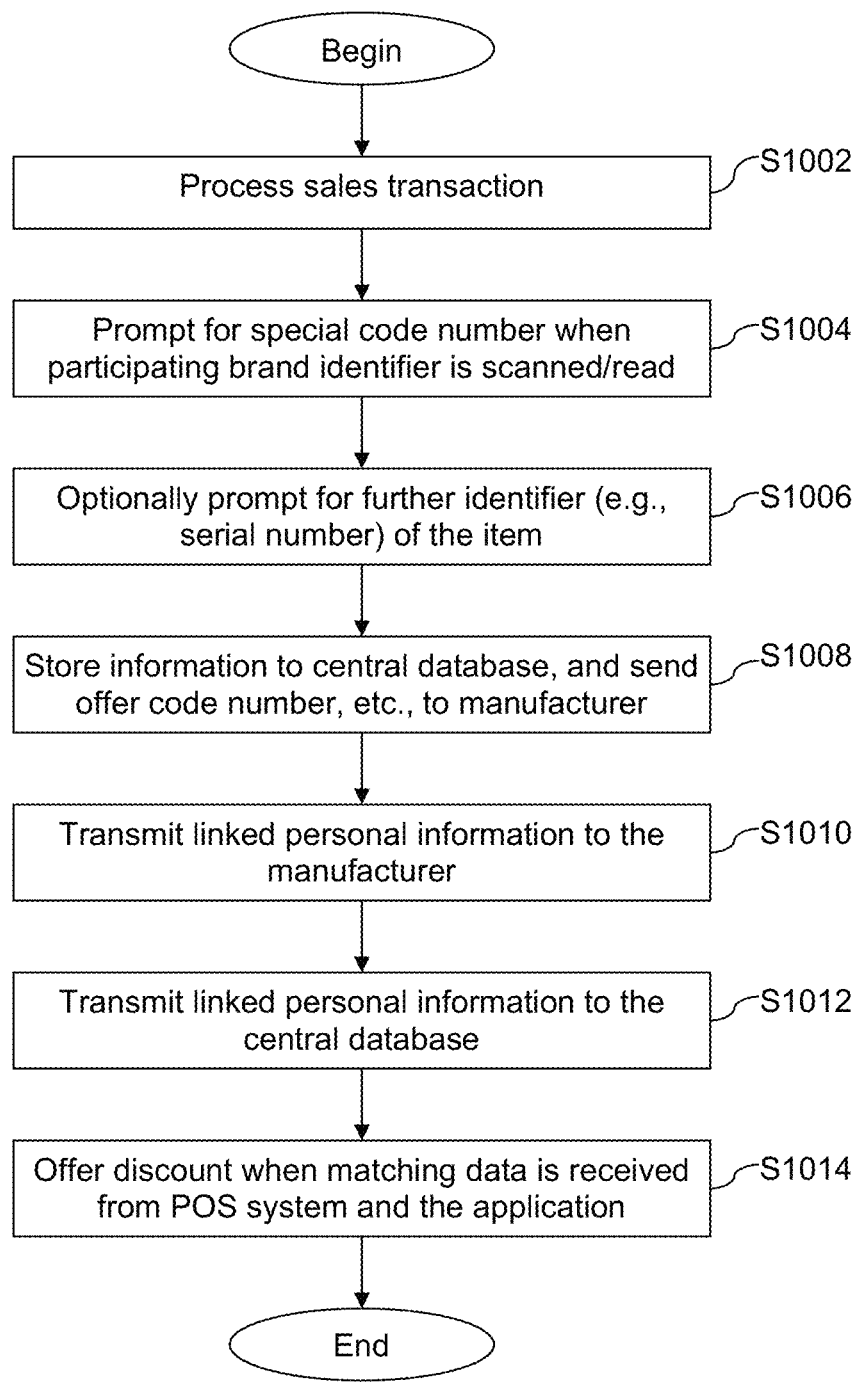

FIG. 10 is a flowchart showing a process for enabling manufacturers to leverage the techniques of certain exemplary embodiments in connection with a participating retailer or the like. In step S1002, the retailer processes the sales transactions, following standard practices, scanning the UPC barcode (or RFID/EPC, NFC, or other suitable identifiers). Because of the participating retailer/manufacturer arrangements, whenever a participating brand UPC or other identifier is scanned or read, the POS register is programmed to prompt for a special code number that represents the detail of the distinct offer as in step S1004. Optionally, in step S1006, the POS register may also prompt for an item serial number (e.g., as disclosed in, for example, U.S. Pat. No. 5,978,774). In step S1008, the POS system stores the information in a central database, and makes available or transmits the transaction information that contains the item UPC number, optional Serial Number, (or EPC and/or the like) and offer code number to the manufacturer. The application may prompt the customer for certain personal information (e.g., name, address, etc.), or this information may be provided when the application is initially downloaded and/or installed. The personal information may be linked to the item information and offer code, and that information may be transmitted to the manufacturer in step S1010. The linked information also may be stored to the central database in step S1012. The discount may be offered by the manufacturer in step S1014 when matching data is received (e.g., at the manufacturer's computer location, at the central database, or other location) from the retailer's POS register and from the application.

For non-competing participating manufacturer(s), in cooperation with a participating retailer, certain exemplary embodiments may enable manufacturers to offer promotional discounts without comparing prices to similar competing brands. Redemption may be made via the retailer as described above in connection with FIG. 4, as described in connection with FIG. 10, and/or in some other way.

It also will be appreciated the example techniques described herein may be used for pure ecommerce retailers, distributers, manufacturers, or other parties (e.g., that lack a physical sales location).

While the invention has been described in connection with exemplary illustrative non-limiting implementations, it is to be understood that the invention is not to be limited to the disclosed implementations, but on the contrary, is intended to cover various modifications and equivalent arrangements included within the spirit and scope of the appended claims.

What is claimed is:

1. A system for providing custom offers to consumers, comprising:
    an electronic device including at least one processor that executes an application comprising instructions that cause the application to at least:
    receive an identifier of a product of interest;
    determine a first price of the product of interest, the first price being a price ordinarily charged by a first seller;
    electronically intercept an attempt to use the electronic device to comparison shop for the product of interest and instead initiate, in connection with the identifier, a price lookup query to determine pricing information from a plurality of other sellers different from the first seller, for the same product as the product of interest; and
    cause the display of a custom offer when the first price is higher than a price charged by one or more of the other sellers as determined using the price lookup query, the custom offer being redeemable in connection with the first seller only and being determined in accordance with a set of predefined rules that are applicable when calculating custom offers, the predefined rules specifying, at least in part, that the custom offer has a value that is larger when a flagged entity charges a price lower than the first price, than when only non-flagged entities charge prices lower than the first price.

2. The system of claim 1, wherein the custom offer is a discount applicable to the first price.

3. The system of claim 2, wherein the discount, when applied to the first price, makes the first price match a lowest price charged by the other sellers.

4. The system of claim 2, wherein the discount, when applied to the first price, makes the first price lower than a lowest price charged by the other sellers by a predetermined amount or percentage.

5. The system of claim 1, further comprising a server including at least one processor configured to perform price lookup queries and calculate custom offers.

6. The system of claim 5, wherein the server includes a non-transitory computer readable storage medium tangibly storing the rules that are applicable when calculating custom offers.

7. The system of claim 5, wherein the server is configured to calculate a rate at which custom offers lead to product purchases from first sellers.

8. The system of claim 7, wherein the server is configured to reduce the value of special offers when the rate exceeds a predefined threshold and to increase the value of special offers when the rate is below the predefined threshold.

9. The system of claim 1, further comprising an in-store point-of-sale (POS) register, the custom offer being redeemable only at the in-store POS register.

10. The system of claim 1, further comprising an offered discount database, the offered discount database including records that store, for each record, indications as to the device and/or consumer for whom a custom offer was generated, the custom offer, a product to which the custom offer applies, and an expiration date for the custom offer.

11. The system of claim 1, wherein the custom offer relates to a product offered by a manufacturer that competes with a manufacturer of the product of interest.

12. An electronic device including at least one processor that executes an application for providing custom offers to a consumer, the application comprising instructions that cause the application to at least:
    receive an identifier of a product of interest;
    determine a first price of the product of interest, the first price being a price ordinarily charged by a first seller;
    in response to a detected attempt to shop for the product of interest from another seller different from the first seller, initiate, in connection with the identifier, a price lookup query to determine pricing information from a plurality of other sellers, different from the first seller, for the same product as the product of interest; and
    cause the display of a custom offer when the first price is higher than a price charged by one or more of the other sellers as determined using the price lookup query, the custom offer being redeemable in connection with the first seller only,
    wherein the electronic device belongs to the consumer and the custom offer includes redemption conditions, displayable with the custom offer on the electronic device, specifying that the custom offer is redeemable by the consumer while at a brick-and-mortar store of the first seller and/or through a subsequent use of an electronic purchasing channel of the first seller.

13. The device of claim 12, wherein the device is a smart phone.

14. The device of claim 13, wherein the smart phone is configured to receive the identifier by taking a picture, receiving an RF signal, and/or receiving a barcode scan while the application is running.

15. A method of providing custom offers to a consumer, the method comprising:
    receiving, from an electronic device that executes a software application, an identifier of a product of interest;
    determining a first price of the product of interest, the first price being a price ordinarily charged by a first seller;
    electronically intercepting an attempt to use the electronic device to comparison shop for the product of interest by instead initiating, in connection with the identifier and the electronic device, a price lookup query using at least one processor to determine pricing information from a plurality of other sellers different from the first seller, for the same product as the product of interest; and
    causing a custom offer generated in response to the price lookup query to be displayed via the electronic device when the first price is higher than a price charged by one or more of the other sellers, the custom offer being redeemable in connection with the first seller only and having a value that cannot be used to offset the first price of the product of interest.

16. The method of claim 15, wherein the custom offer is displayed in a format such that it is redeemable at a point-of-sale (POS) register.

17. The method of claim 15, wherein the custom offer relates to a product offered by a manufacturer that competes with a manufacturer of the product of interest.

18. The method of claim 15, wherein the device is a smart phone that is configured to receive the identifier by taking a picture of the identifier, receiving near field communication (NFC) information, and/or reading an EPC/RFID tag.

19. The method of claim 15, wherein price lookup queries are performed, and custom offers are calculated, by a server including at least one processor.

20. The method of claim 19, wherein the server includes a non-transitory computer readable storage medium tangibly storing rules that are applicable when calculating custom offers.

21. The method of claim 19, wherein the server is configured to calculate a rate at which custom offers lead to product purchases from first sellers.

22. The method of claim 21, wherein the server is configured to reduce the value of special offers when the rate exceeds a predefined threshold and to increase the value of special offers when the rate is below the predefined threshold.

23. The method of claim 15, further comprising storing records to an offered discount database, each record including indications as to the device and/or consumer for whom a custom offer was generated, the custom offer, a product to which the custom offer applies, and an expiration date for the custom offer.

24. The method of claim 15, wherein the pricing information is obtained via screen scraping respective websites of the other sellers.

25. A non-transitory computer readable storage medium tangibly storing instructions that cause an electronic device to perform at least:

receive an identifier of a product of interest;

determine a first price of the product of interest, the first price being a price ordinarily charged by a first seller;

in response to a detected attempt to shop for the product of interest from another seller different from the first seller, initiate, in connection with the identifier and the electronic device, a price lookup query to determine pricing information from a plurality of other sellers different from the first seller, for the same product as the product of interest and one or more similar products indicated as being substitutes for the product of interest; and cause a custom offer to be displayed via the electronic device when the first price is higher than a price charged by one or more of the other sellers as determined using the price lookup query, the custom offer being redeemable in connection with the first seller only and being redeemable in connection with similar product indicated as being substitutes for the product of interest.

26. The non-transitory computer readable storage medium of claim 25, wherein the custom offer has a value that is larger when a flagged competitor offers a better price than the first price, than when only non-flagged competitors offer better prices than the first price.

27. The non-transitory computer readable storage medium of claim 25, wherein the electronic device belongs to the consumer and the custom offer is redeemable by the consumer only while at a brick-and-mortar store of the first seller and/or only through a subsequent use of an electronic purchasing channel of the first seller.

28. The non-transitory computer readable storage medium of claim 25, wherein the custom offer is redeemable only at an in-store location from which the price lookup query was initiated.

29. The non-transitory computer readable storage medium of claim 25, wherein the custom offer is redeemable only via a sales channel different from the one in which the price lookup query was initiated.

* * * * *